No. 790,600. PATENTED MAY 23, 1905.
F. M. STAMBAUGH.
MACHINE FOR BENDING PIPE.
APPLICATION FILED MAR. 7, 1905.

Witnesses
A. J. McCauley
G. A. Pennington

Inventor:-
Francis M. Stambaugh
BY Bakewell & Cornwall
ATTY'S.

No. 790,600. Patented May 23, 1905.

UNITED STATES PATENT OFFICE.

FRANCIS M. STAMBAUGH, OF ST. LOUIS, MISSOURI, ASSIGNOR TO THE AMERICAN BRAKE COMPANY, OF ST. LOUIS, MISSOURI, A CORPORATION OF MISSOURI.

MACHINE FOR BENDING PIPE.

SPECIFICATION forming part of Letters Patent No. 790,600, dated May 23, 1905.

Application filed March 7, 1905. Serial No. 248,852.

*To all whom it may concern:*

Be it known that I, FRANCIS M. STAMBAUGH, a citizen of the United States, residing at St. Louis, Missouri, have invented a certain new and useful Improvement in Machines for Bending Pipe, of which the following is a full, clear, and exact description, such as will enable others skilled in the art to which it appertains to make and use the same, reference being had to the accompanying drawings, forming part of this specification, in which—

Figure 1:
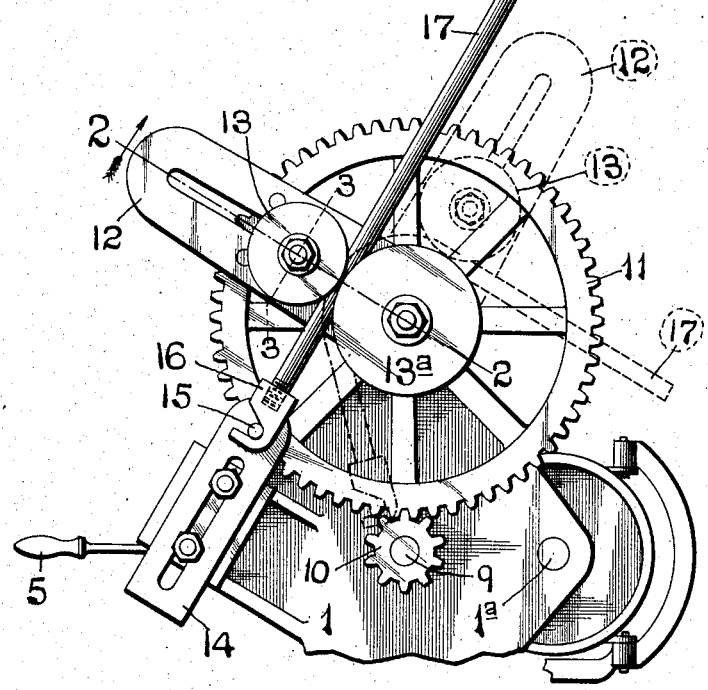
Figure 2:
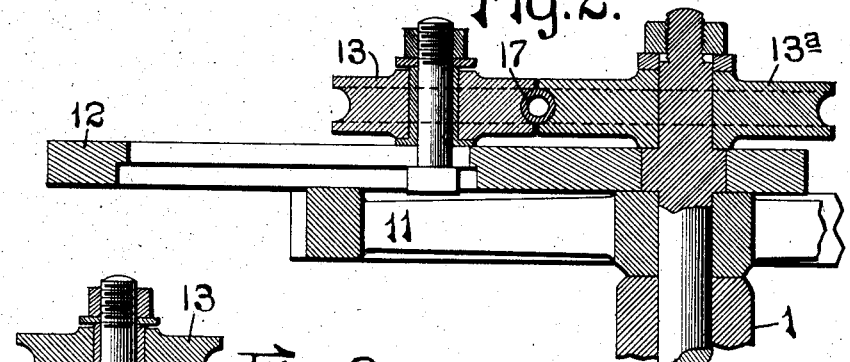
Figure 3:
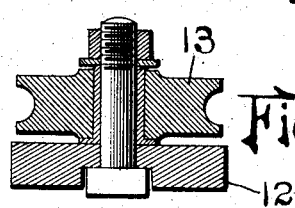

Figure 1 is a front elevational view of my improved pipe-bending machine. Fig. 2 is an enlarged sectional view on the line 2 2 of Fig. 1, and Fig. 3 is a detail sectional view on the line 3 3 of Fig. 1.

This invention relates to a new and useful improvement in pipe-bending machines, the object being to construct a machine which is simple and powerful and which will enable the pipe to be quickly and easily arranged in position to be bent and as readily removed after being bent.

With this object in view the invention consists in the construction, arrangement, and combination of the several parts, all as will be hereinafter described and afterward pointed out in the claims.

In the drawings the frame 1 is provided with bearings for the shafts and moving parts of the machine, and through appropriate oppositely-moving pulleys and clutch mechanism the counter-shaft 9 is driven in one direction or the other, and through its pinion 10 the gear 11 is rotated in one direction or the other at the will of the operator. This gear 11 is provided with a slotted block 12, which provides a support for a grooved roller 13, coöperating with companion grooved roller $13^a$, concentric with the gear 11. The adjustable block 14 is in this case provided with a pin 15, which pin coöperates with the open-ended hook of a coupling-clevis 16. This coupling-clevis has a threaded portion in its upper end for receiving the pipe 17 to be bent. The rollers 13 and $13^a$ bear a fixed relation to each other at all times and are so arranged that their peripheries are in proximity to each other, their grooves forming a circular opening, as shown in Fig. 2, through which the pipe to be bent passes.

In bending a pipe the pipe is screwed into the clevis 16, introduced from below between the rollers 13 and $13^a$, and the hook adjusted on the pin 15. The lever 5 is now manipulated so as to drive the gear 11 and its connected block to the position shown in dotted lines, wherein the roller 13 will have bent the pipe as shown, the pull on the pipe in the bending action being upwardly with respect to the clevis 16 and against the pin 15. When the pipe has been bent sufficiently so that the legs thereof occupy the desired angular relation to each other, the lever 5 is moved in the opposite direction, so as to reversely rotate the gear 11, which reverse rotation causes the hook of the clevis 16 to move away from the pin 15, as shown by the dot-and-dash lines in Fig. 1. In this position the clevis 16 may be readily unscrewed from the pipe and the pipe withdrawn from between the rollers. Pipes bent as above described are preferably in uniform lengths, it being desirable to have their legs occupy a given angular relation to each other in order that all of said pipes will be uniform. The particular pipes which my improvement is designed to bend are used in air-brake systems.

It is obvious that block 14 may be adjusted to regulate the length of the short straight leg of the pipe and also that the rollers 13 and $13^a$ may be interchanged for rollers of different sizes and having grooves of different radii for different-sized pipes.

While the pipe is preferably cold when bent, it is obvious that the pipe could be heated before being bent. It will also be understood that in speaking of reversely rotating the machine to free the clevis-coupling this is not absolutely necessary, as the coupling can be freed by hand after the machine has started to return or has returned to its home position by slipping the pipe in the proper direction between the grooved rollers.

Having thus described the invention, what is claimed as new, and desired to be secured by Letters Patent, is—

1. In a pipe-bending machine, the combination with grooved rollers one of which is revoluble about the other, a coupling-clevis having an open-ended hook, and a fixed pin with which said hook engages, said coupling-clevis forming a holding device for the pipe to be bent; substantially as described.

2. In a pipe-bending machine, the combination with two grooved rollers one of which is revoluble about the other, an adjustable block provided with a projection, and a threaded coupling-clevis having an open-ended hook, said coupling-clevis receiving the pipe to be bent and holding the same in the bending action, the reverse movement of the machine disengaging the coupling-clevis from its cooperating element and moving the same to a position wherein the coupling-clevis may be unscrewed from the bent pipe; substantially as described.

3. In a pipe-bending machine, the combination with bending elements, of a coupling-clevis threaded onto the pipe to be bent, an open-ended hook on said coupling-clevis, a pin with which said hook engages, said parts being so arranged that in the bending movement the hook pulls against the pin to hold one end of the pipe stationary, and in the reverse movement the hook is freed from the pin and the coupling-clevis moved to a position away from said pin; substantially as described.

In testimony whereof I hereunto affix my signature, in the presence of two witnesses, this 3d day of March, 1905.

FRANCIS M. STAMBAUGH.

Witnesses:
EDWARD WILSON,
GEORGE BAKEWELL.